United States Patent
Chatterji et al.

(10) Patent No.: US 7,077,219 B1
(45) Date of Patent: Jul. 18, 2006

(54) FOAMED TREATMENT FLUIDS AND ASSOCIATED METHODS

(75) Inventors: Jiten Chatterji, Duncan, OK (US); Gary P. Funkhouser, Duncan, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/060,941

(22) Filed: Feb. 18, 2005

(51) Int. Cl.
  *E21B 21/01* (2006.01)
  *E21B 43/04* (2006.01)
  *E21B 43/26* (2006.01)
  *E21B 43/34* (2006.01)
  *E21B 43/40* (2006.01)

(52) U.S. Cl. ............... 175/66; 166/267; 166/278; 166/302; 166/308.6; 166/309; 166/312; 175/69; 507/102; 507/134; 507/135; 507/202; 507/252; 507/254; 507/259; 507/904

(58) Field of Classification Search ............. 175/66, 175/69, 71; 166/267, 278, 302, 308.6, 309, 166/312; 507/102, 134, 135, 202, 252, 254, 507/259, 904
See application file for complete search history.

(56) References Cited

U.S. PATENT DOCUMENTS

| | | | |
|---|---|---|---|
| 3,303,896 A | 2/1967 | Tillotson et al. | |
| 3,610,340 A | 10/1971 | McKinell et al. | |
| 4,232,741 A | 11/1980 | Richardson et al. | |
| 4,480,696 A | 11/1984 | Almond et al. | |
| 4,519,455 A | 5/1985 | Holtmyer et al. | |
| 4,554,082 A | 11/1985 | Holtmyer et al. | |
| RE32,302 E | 12/1986 | Almond et al. | |
| 4,627,495 A | 12/1986 | Harris et al. | |
| 5,385,206 A | 1/1995 | Thomas | |
| 5,566,760 A | 10/1996 | Harris | |
| 5,588,489 A | 12/1996 | Chatterji et al. | |
| 5,591,701 A | 1/1997 | Thomas | |
| 5,711,801 A | 1/1998 | Chatterji et al. | |
| 5,875,844 A | 3/1999 | Chatterji et al. | |
| 5,990,052 A | 11/1999 | Harris | |
| 6,063,738 A | 5/2000 | Chatterji et al. | |
| 6,145,591 A * | 11/2000 | Boncan et al. | 166/291 |
| 6,148,932 A | 11/2000 | Argillier et al. | |
| 6,156,808 A | 12/2000 | Chatterji et al. | |
| 6,210,476 B1 | 4/2001 | Chatterji et al. | |
| 6,227,294 B1 | 5/2001 | Chatterji et al. | |
| 6,244,343 B1 | 6/2001 | Brothers et al. | |
| 6,273,191 B1 | 8/2001 | Reddy et al. | |
| 6,279,652 B1 | 8/2001 | Chatterji et al. | |
| 6,286,601 B1 | 9/2001 | Argillier et al. | |
| 6,297,202 B1 | 10/2001 | Chatterji et al. | |
| 6,302,209 B1 | 10/2001 | Thompson, Sr. et al. | |
| 6,336,505 B1 | 1/2002 | Reddy | |
| 6,367,550 B1 | 4/2002 | Chatterji et al. | |
| 6,454,004 B1 | 9/2002 | Reddy et al. | |
| 6,457,524 B1 | 10/2002 | Roddy | |
| 6,460,632 B1 | 10/2002 | Chatterji et al. | |
| 6,500,252 B1 | 12/2002 | Chatterji et al. | |
| 6,516,883 B1 | 2/2003 | Chatterji et al. | |
| 6,547,871 B1 | 4/2003 | Chatterji et al. | |
| 6,619,399 B1 | 9/2003 | Chatterji et al. | |
| 6,630,021 B1 | 10/2003 | Reddy et al. | |
| 6,668,927 B1 | 12/2003 | Chatterji et al. | |
| 6,708,760 B1 | 3/2004 | Chatterji et al. | |
| 6,722,433 B1 | 4/2004 | Brothers et al. | |
| 6,767,867 B1 | 7/2004 | Chatterji et al. | |
| 6,793,730 B1 | 9/2004 | Reddy et al. | |
| 6,797,054 B1 | 9/2004 | Chatterji et al. | |
| 6,852,676 B1 | 2/2005 | Chatterji et al. | |
| 6,966,379 B1 * | 11/2005 | Chatterji et al. | 166/308.6 |
| 6,986,392 B1 * | 1/2006 | Chatterji et al. | 166/300 |
| 2003/0221831 A1 | 12/2003 | Reddy et al. | |
| 2003/0221832 A1 | 12/2003 | Reddy et al. | |
| 2004/0168801 A1 | 9/2004 | Reddy et al. | |
| 2004/0168830 A1 | 9/2004 | Reddy et al. | |
| 2004/0177963 A1 | 9/2004 | Chatterji et al. | |
| 2004/0200616 A1 | 10/2004 | Chatterji et al. | |
| 2005/0067170 A1 * | 3/2005 | Richard | 166/387 |
| 2005/0205263 A1 * | 9/2005 | Richard | 166/369 |

* cited by examiner

*Primary Examiner*—George Suchfield
(74) *Attorney, Agent, or Firm*—Craig W. Roddy; Baker Botts L.L.P.

(57) ABSTRACT

Methods in which temperature is used to control the foaming and/or defoaming of foamed treatment fluids comprising an aqueous liquid, an ionic foaming surfactant, and a gas are provided. A method of treating at least a portion of a subterranean formation is provided, the method comprising: providing a treatment fluid having a foam transition temperature, the treatment fluid comprising an aqueous liquid, and an ionic foaming surfactant; foaming the treatment fluid to form a foamed treatment fluid; circulating the foamed treatment fluid in a well bore penetrating the subterranean formation; and defoaming at least a substantial portion of the foamed treatment fluid, the defoaming comprising lowering the temperature of the foamed treatment fluid to about at or below the foam transition temperature.

20 Claims, No Drawings

FOAMED TREATMENT FLUIDS AND ASSOCIATED METHODS

BACKGROUND

The present invention relates to foamed treatment fluids and, more particularly, to methods in which temperature is used to control the foaming and/or defoaming of foamed treatment fluids comprising an aqueous liquid, an ionic foaming surfactant, and a gas.

Foamed treatment fluids may be used in a variety of subterranean treatments, such as drilling operations, well bore cleanup operations, fracturing treatments, sand control treatments, and the like. As used herein, a "treatment fluid" refers to any fluid used in subterranean treatments for a desired function and/or a desired purpose and does not imply any particular action by the fluid. Foamed treatment fluids generally include an aqueous liquid, a surfactant for foaming and/or stabilizing the fluid, and a gas. In addition to being lightweight, foamed treatment fluids may effectively carry particulates (e.g., drill cuttings, particulate debris, proppant particulates). Additionally, foamed treatment fluids have low fluid loss properties, reducing or removing the need for fluid loss control additives.

Drilling operations are one example of a subterranean treatment that may use a foamed treatment fluid. During drilling operations, a foamed treatment fluid (e.g., a foamed drilling fluid) passes down through the inside of the drill string, exits through the drill bit, and returns to the drilling rig through the annulus between the drill string and well bore. The circulating foamed drilling fluid, among other things, lubricates the drill bit, transports drill cuttings to the surface, and balances the formation pressure exerted on the well bore. Among other things, the foamed drilling fluid should have sufficient foam quality to suspend drill cuttings. Foamed treatment fluids also may be used in a variety of well bore cleanup operations to transport and remove debris particulates (e.g., drill cuttings, formation debris, etc.) from the well bore or the near well bore region.

Another example of a subterranean treatment that may use a foamed treatment fluid is a fracturing treatment. In a fracturing treatment, a foamed treatment fluid (e.g., a foamed fracturing fluid) is introduced into a well bore at or above a pressure sufficient to create or enhance one or more fractures in a portion of the subterranean formation. The foamed fracturing fluid may comprise particulates, often referred to as "proppant particulates," that are deposited in the fractures. The proppant particulates function to prevent the fractures from fully closing upon the release of pressure, forming conductive channels through which fluids may flow to the well bore. After the fracturing operation is complete, the pressure on the well bore is released. This allows the gas in the foamed fracturing fluid to expand and, with this expansion, the energized foamed fracturing fluid flows from the formation, flows into the well bore, and exits the well bore at the surface.

Foamed treatments fluids also may be used in sand control treatments, such as gravel packing. In gravel pack treatments, the foamed treatment fluid suspends gravel particulates for delivery to a desired area in a well bore, e.g., near unconsolidated or weakly consolidated formation zones, to form a gravel pack that enhances sand control. One common type of gravel packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the gravel particulates from entering the production tubing. Once the gravel pack is substantially in place, the pressure on the well bore is released. This allows the gas in the foamed treatment fluid to expand and, with this expansion, the foamed treatment fluid flows from the formation, into the well bore, and exits the well bore at the surface.

Defoaming of the foamed treatment fluid subsequent to use may be desirable for a number of reasons. For instance, defoaming may allow the treatment fluid and its components to be recycled for subsequent use. Further, defoaming prior to mechanical separation of the particulates from the foamed treatment fluid should reduce the expense and complexity associated with the separation process. In some instances, after recovery from the well bore, the foamed treatment may be placed in a settling pond where, over time, the foam will dissipate. But storage of the foamed treatment fluid to allow sufficient time for dissipation of the foam may be problematic, due to, among other things, long turnaround times and increased environmental impact. Thus, in certain circumstances it may be desirable to control the defoaming process.

Controlling the pH of the foamed treatment fluid is one method that has been used to facilitate foaming and defoaming. In some instances, certain surfactants and combinations thereof have been used to facilitate foaming and defoaming in response to pH changes. For example, after the foamed treatment fluid has been recovered from the well bore, it may be defoamed by lowering its pH. However, controlling the pH of the foamed treatment fluid may increase the complexity of the subterranean treatment due to, among other things, the use of buffers for providing the needed pH for foaming and also the use of acids for lowering the pH of the foamed treatment fluid sufficiently for defoaming.

SUMMARY

The present invention relates to foamed treatment fluids and, more particularly, to methods in which temperature is used to control the foaming and/or defoaming of foamed treatment fluids comprising an aqueous liquid, an ionic foaming surfactant, and a gas.

In one embodiment, the present invention provides a method of treating at least a portion of a subterranean formation comprising: providing a treatment fluid having a foam transition temperature, the treatment fluid comprising an aqueous liquid, and an ionic foaming surfactant; foaming the treatment fluid to form a foamed treatment fluid; circulating the foamed treatment fluid in a well bore penetrating the subterranean formation; and defoaming at least a substantial portion of the foamed treatment fluid, the defoaming comprising at least the step of lowering the temperature of the foamed treatment fluid to about at or below the foam transition temperature.

In another embodiment, the present invention provides a method of cycling the foaming of a treatment fluid comprising: providing a treatment fluid comprising an aqueous liquid and an ionic foaming surfactant; foaming the treatment fluid to form a foamed treatment fluid having a foam transition temperature, the foaming comprising the steps of: combining the treatment fluid with a gas so that the gas is at least partially incorporated into the treatment fluid, and raising the temperature of the treatment fluid to about at or above the foam transition temperature; and defoaming at least a portion of the foamed treatment fluid, the defoaming comprising at least the step of lowering the temperature of the foamed treatment fluid to about at or below the foam transition temperature.

In another embodiment, the present invention provides a method of drilling comprising: providing a treatment fluid having a foam transition temperature, the treatment fluid comprising an aqueous liquid, a salt, and an ionic foaming surfactant comprising an alcohol ether sulfate; foaming the treatment fluid to form a foamed treatment fluid; circulating the foamed treatment fluid in a well bore penetrating a subterranean formation so that a plurality of debris particulates present in the well bore become suspended in the foamed treatment fluid; and defoaming at least a portion of the foamed treatment fluid, the defoaming comprising at least the step of lowering the temperature of the foamed treatment fluid to about at or below the foam transition temperature.

The features and advantages of the present invention will be readily apparent to those skilled in the art upon a reading of the description of the preferred embodiments that follows.

DESCRIPTION OF PREFERRED EMBODIMENTS

The present invention relates to foamed treatment fluids and, more particularly, to methods in which temperature is used to control the foaming and/or defoaming of foamed treatment fluids comprising an aqueous liquid, an ionic foaming surfactant, and a gas.

Generally, the treatment fluids of the present invention used to form the foamed treatment fluids of the present invention comprise an aqueous liquid and an ionic foaming surfactant. According to the methods of the present invention, the foaming of a treatment fluid of the present invention and its subsequent defoaming may be controlled by manipulating the temperature of the fluid at or around its foam transition temperature. As used herein, the "foam transition temperature" refers to the temperature range at which a treatment fluid of the present invention forms a stable foam, and a foamed treatment fluid of the present invention reverts to an unfoamed fluid. As used herein, the term "stable foam" refers to a foam that has the desired properties (e.g., half life, foam quality, viscosity) for a particular application. It is understood that some foam may be present at temperatures below the foam transition temperature, but such foam does not have sufficient properties for use in subterranean treatments. At temperatures at or above the foam transition temperature, the ionic foaming surfactant is solubilized and available for foaming.

In some instances, the foam transition temperature may be an exact temperature; in other instances, it may be more correctly described as a temperature range of, for example, 5 to 10 degrees. Generally speaking, the purer the surfactant, the narrower the range may be for the foam transition temperature. The foam transition temperature for a particular foamed treatment fluid may be affected by many factors, including, for example, the composition of the fluid, the amount of ethoxylation in the ionic foaming surfactant, and the types and/or concentrations of salts present. Further, the foam transition temperature for a particular foamed treatment fluid may be determined through laboratory testing. In some instances, it is believed that the foam transition temperature is related to but slightly below the Krafft point of the ionic foaming surfactant contained in the treatment fluid. The Krafft point is the temperature (more precisely, the narrow temperature range) above which the solubility of a surfactant rises sharply and, at this temperature, the solubility of a surfactant is equal to the critical micelle concentration. IUPAC Compendium of Chemical Terminology (2d ed. 1997).

The foam transition temperature may vary as necessary for a particular application. Among other ways, the foam transition temperature of a particular foamed treatment fluid may be adjusted by the amount of ethoxylation of the ionic foaming surfactant and/or the types and/or concentrations of salts present. While a particular foam transition temperature may vary dependent upon the particular application, the foam transition temperature should preferably be below bottomhole temperatures, thereby allowing formation and/or maintenance of a stable foam while the foamed treatment fluid is in the well bore. In some embodiments, the foam transition temperature may be about at ambient surface temperature. A foam transition temperature of about at ambient surface temperature should allow relatively small temperature changes to facilitate foaming and defoaming. One of ordinary skill in the art, with the benefit of this disclosure will be able to determine the appropriate foam transition temperature for a particular application based on, among other things, bottomhole temperatures, ambient surface temperatures, and the ionic foaming surfactant chosen.

Generally, foaming the treatment fluids of the present invention may comprise combining a treatment fluid of the present invention with a gas so that the gas is at least partially incorporated into the treatment fluid, and raising the temperature of the treatment fluid above the foam transition temperature. At temperatures about at or above the foam transition temperature, it is believed that the ionic foaming surfactant may reduce the surface tension between the gas and the aqueous liquid, thereby generally facilitating the formation of a foam. In some embodiments, the gas may be combined with the treatment fluid as the treatment fluid is being introduced into the well bore.

Any suitable methodology and combinations thereof may be used to raise the temperature of the treatment fluids of the present invention. For example, the temperature of a treatment fluid of the present invention may be raised by exposure to an environment at a higher temperature than the treatment fluid. In some embodiments, the temperature of the treatment fluid may be raised by introducing the treatment fluid into a well bore. In such embodiments, once the treatment fluid is introduced into the well bore the temperature of the fluid may tend to rise, due to temperatures encountered in the well bore. These well bore temperatures are generally higher than ambient surface temperatures and may heat the treatment fluid. In some embodiments, the temperature of the treatment fluid may be raised using a mechanical heater, such as those using oil, water, or steam. In yet another embodiment, raising the temperature of the treatment fluid may include a combination of mechanical heating and environmental exposure. In some embodiments, the foam transition temperature may be about at or slightly above ambient surface temperatures so that the treatment fluid may be foamed without the need for a large temperature change. Alternatively, in some embodiments, raising the temperature of the treatment fluid may not be necessary to facilitate foaming. For example, where the foam transition temperature is about at or below the ambient surface temperature, raising the temperature of the treatment fluid should not be necessary to facilitate foaming because, after preparation, the treatment fluid should be at or above the foam transition temperature.

At temperatures about at or below the foam transition temperature, the foamed treatment fluids of the present invention may be defoamed. Once the temperature is sufficiently lowered a foamed treatment fluid of the present invention may destabilize and the gas contained therein may escape, thereby generally defoaming the foamed treatment fluid. Any suitable methodology and combinations thereof may be used to lower the temperature of the foamed treatment fluid. In some embodiments, a heat exchanger, such as an air-cooled or a water-cooled heat exchanger may be used. In other embodiments, the temperature of the foamed treatment fluid may be lowered due to exposure to an environment at a lower temperature than the foamed treatment fluid. For example, when in the well bore, the temperature of the foamed treatment fluid may tend to reach bottomhole temperatures. Thus, as the foamed treatment fluid is recovered from the well bore, the temperature of the foamed treatment fluid may lower, due to the reduced temperatures at the shallower depths. Once the foamed treatment fluid is at the surface, it may tend to cool to ambient surface temperatures, thereby further lowering the temperature of the foamed treatment fluid. In some embodiments, the foam transition temperature may be above ambient surface temperatures. In such embodiments, the temperature of the foamed treatment fluid may be lowered to about at or below the foam transition temperature as the foamed treatment fluid is recovered due to conditions in the well bore and/or ambient surface temperatures. Among other things, the above-described foaming and defoaming may allow for recycling of the treatment fluid and/or reduced volume of the treatment fluid for disposal.

The foaming and defoaming of the treatment fluid may be cycled multiple times by raising and lowering the temperature thereof in the manner described above. Additional amounts of the ionic foaming surfactant and/or additional additives may be added to the treatment fluid after defoaming as needed, for example, due to adsorption of the ionic foaming surfactant onto cuttings, the formation, etc. One of ordinary skill in the art, with the benefit of this disclosure, will be able to determine the amount and type of additives to include in the treatment fluid after defoaming and prior to its subsequent use.

The aqueous liquids used in the treatment fluids of the present invention may include fresh water, seawater, saltwater (e.g., natural brines, formulated brines, etc.), and combinations thereof. The aqueous liquid may be from any source provided that it does not contain an excess of compounds that adversely affect the foamed treatment fluids of the present invention.

Any ionic foaming surfactant may be used in the treatment fluids of the present invention that may be capable of facilitating the formation of a foam in an aqueous liquid. Suitable ionic foaming surfactants include, but are not limited to, alcohol ether sulfates, alpha olefin sulfonates, alkanesulfonates, alkyl sulfates, derivatives thereof, and combinations thereof. Suitable alkyl sulfates may have the following formula:

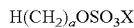  Formula I wherein a is an integer in the range of from about 8 to about 18, and X is any compatible cation, such as sodium or ammonium. Suitable alcohol ether sulfates may have the following formula:

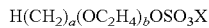  Formula II wherein a is an integer in the range of from about 5 to about 16, b is an integer in the range of from about 1 to about 10, and X is any compatible cation, such as sodium or ammonium. An example of a suitable alcohol ether sulfate of Formula II is commercially available as "HOWCO SUDS™" from Halliburton Energy Services, Duncan, Okla. The foaming properties of alcohol ether sulfates may be adjusted by ethoxylation. Accordingly, by increasing the ethylene oxide substitution the foam transition temperature of the foamed treatment fluid may be reduced. In certain embodiments, at least a portion of the alcohol ether sulfates is ethoxylated with up to about 5 moles of ethylene oxide. Suitable alpha-olefin sulfonates may be prepared from alpha olefins having from about 8 to about 18 carbons. An example of a suitable alpha olefin sulfonate is commercially available as "AQF-2™" from Halliburton Energy Services, Duncan, Okla.

Generally, the ionic foaming surfactants used in the treatment fluids of the present invention may be present in an amount sufficient to foam and stabilize the treatments fluids of the present invention at temperatures about at or above the foam transition temperature, thereby forming a foamed treatment fluid of the present invention. In some embodiments, the ionic foaming surfactant is present in the treatment fluids of the present invention in an amount in the range of from about 0.01% to about 5% by volume of the treatment fluid therein. In certain embodiments, the ionic foaming surfactant is present in the treatment fluids of the present invention in an amount in the range of from about 0.5% to about 2% by volume of the treatment fluid therein.

To facilitate mixing with the other components of the treatment fluids of the present invention, the ionic foaming surfactant used in the present invention may be combined with a base fluid. The base fluid may be any surfactant solubilizer, such as water, simple alcohols, or mixtures thereof, capable of solubilizing the ionic foaming surfactant. Accordingly, in some embodiments, the treatments fluids of the present invention further may comprise a surfactant solubilizer.

A salt may optionally be included in the treatment fluids of the present invention. The concentration and charge of the salt included in the treatment fluids of the present invention affects the surfactant solubility of the ionic foaming surfactant present in the treatment fluid. It has been found that increasing the concentration of the salts present in the treatment fluids of the present invention should likewise increase the foam transition temperature of the fluids. As a result, the foam transition temperature of the treatment fluids of the present invention may be adjusted by including one or more salts in the fluid. In some embodiments, the salt may be present in the aqueous liquid prior to preparation of the treatment fluids of the present invention, for example, where the aqueous liquid comprises a brine or seawater. Suitable salts may comprise lithium, ammonium, sodium, potassium, cesium, magnesium, calcium, or zinc cations, and chloride, bromide, iodide, formate, nitrate, acetate, cyanate, or thiocynate. Examples of suitable salts that comprise the above-listed anions and cations include, but are not limited to, ammonium chloride, lithium bromide, lithium chloride, lithium formate, lithium nitrate, calcium bromide, calcium chloride, calcium nitrate, calcium formate, sodium bromide, sodium chloride, sodium formate, sodium nitrate, potassium chloride, potassium bromide, potassium nitrate, potassium formate, cesium nitrate, cesium formate, cesium chloride, cesium bromide, magnesium chloride, magnesium bromide, zinc chloride, zinc bromide, and combinations thereof. While divalent and trivalent cations may be suitable for use in the treatment fluids of the present invention, they may cause undesirable interactions, due to, among other things, the solubility point of their respective salts with anionic foaming surfactants.

Generally, a salt may be included in the treatment fluids of the present invention in an amount sufficient to provide the desired foam transition temperature. In certain embodiments, a salt may be present in the treatments fluids of the present invention in an amount in the range of from about 0.1% to about 10% by weight of the treatment fluid. In certain embodiments, a salt may be present in the treatment fluid of the present invention in an amount in the range of from about 0.1% to about 1% by weight of the treatment fluid.

Buffers also may optionally be included in the treatment fluids of the present invention, among other things, to provide the desired pH for a particular application. Examples of suitable buffers include, but are not limited to, sodium acetate, acetic acid, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium hydroxide, potassium hydroxide, lithium hydroxide, combinations thereof, derivatives thereof, and the like. One of ordinary skill in the art, with the benefit of this disclosure, will recognize the appropriate buffers and amount thereof to use for a chosen application, based on among other things the desired foam transition temperature, the chosen ionic foaming surfactant, and the amount and type salt present in the treatment fluid.

The treatment fluids of the present invention may further comprise particulates (such as proppant particulates or gravel particulates) suitable for use in subterranean applications. Particulates suitable for use in the present invention may comprise any material suitable for use in subterranean operations. Suitable particulate materials include, but are not limited to, sand; bauxite; ceramic materials; glass materials; polymer materials; Teflon® materials; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates; and combinations thereof. Suitable composite particulates may comprise a binder and a filler material wherein suitable filler materials include silica, alumina, carbon black, graphite, mica, titanium dioxide, talc, zirconia, fly ash, hollow glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In particular embodiments, preferred particulates size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials) and mixtures thereof. Moreover, fibrous materials, that may or may not be used to bear the pressure of a closed fracture, are often included in fracturing and sand control treatments. Generally, the particulates may be included in the treatment fluids of the present invention in an amount suitable for a particular application. In certain embodiments, particulates may be present in the treatment fluids of the present invention in an amount in the range of from about 5 pounds to about 22 pounds per gallon of the aqueous liquid.

Depending on, among other things, the particular application, the treatment fluids of the present invention may further comprise a gelling agent. As used herein, the phrase "gelling agent" refers to a material capable of gelling an aqueous liquid, thereby increasing its viscosity. Examples of suitable gelling agents include, but are not limited to, natural or derivatized polysaccharides (e.g. galactomannan gums, modified galactomannan gums, etc.) that are soluble, dispersible, or swellable in an aqueous liquid, modified celluloses and derivatives thereof (e.g., hydroxyethylcellulose, carboxymethylhydroxyethylcellulose, hydroxyethylcellulose grafted with vinylphosphonic acid, etc.), and biopolymers (e.g., xanthan gum, welan gum, etc.). Other examples of suitable gelling agents include, but are not limited to, water dispersible hydrophilic organic polymers (e.g., polyacrylamide and polymethacrylamide), certain water-soluble polymers, and polymerizable water-soluble monomers (e.g., acrylic acid, methacrylic acid, acrylamide, methacrylamide, etc.).

The gelling agents should be included in the treatment fluids of the present invention in an amount sufficient to provide a desired viscosity. In certain embodiments, the gelling agent should be present in the treatment fluids of the present invention in amount in the range of from about 0.125% to about 0.375% by weight of the aqueous liquid.

The treatment fluids of the present invention may optionally comprise additional additives, including, but not limited to, gel breakers (e.g., enzymes, oxidizers, acids, etc.) fluid loss control additives, corrosion inhibitors, crosslinking agents, scale inhibitors, catalysts, clay control agents, biocides, friction reducers, combinations thereof, and the like. Individuals skilled in the art, with the benefit of this disclosure, will recognize the types and amounts of additives that may be necessary for inclusion in the treatment fluids of the present invention for a particular application.

The gas combined with the treatment fluids of the present invention may be any gas suitable for foaming the treatment fluids of the present invention. Suitable gases include, but are not limited to, air, nitrogen, carbon dioxide, methane, and combinations thereof. In certain embodiments, the gas may be compressed and combined with a treatment fluid of the present invention downstream of the pump or pumps used to introduce the treatment fluid into a well bore. Generally, the gas should be combined with the treatment fluids of the present invention in an amount sufficient to provide the desired foam. In certain embodiments, the gas may be combined with the treatment fluids of the present invention in an amount in the range of form about 15% to about 80% by volume of the aqueous liquid. In certain embodiments, the gas may be combined with the treatment fluids of the present invention in an amount in the range of from about 50% to about 80% by volume of the aqueous liquid.

Suitable treatments may include any of a variety of subterranean treatments where a foamed treatment fluid may be used, including, but not limited to, drilling operations, well bore cleanup operations, fracturing treatments, sand control treatments, and the like. In some embodiments, the foamed treatment fluids of the present invention may be used in treating at least a portion of a subterranean formation. In the treating embodiments, a treatment fluid of the present invention comprising an aqueous liquid, and an ionic foaming surfactant may be provided and foamed so as to form a foamed treatment fluid. The foamed treatment fluid may be circulated in a well bore penetrating the subterranean formation. The treatment fluid may be foamed as described above. At a desired time, the foamed treatment fluid may be recovered through the well bore to the surface. During recovery to the surface and/or at the surface, the temperature of the foamed treatment fluid may be lowered to about at or below the foam transition temperature so as to defoam the foamed treatment fluid. The foaming and/or defoaming may be repeated so that the treatment fluid may be reused as desired in the same or a different subterranean treatment.

In some embodiments, the foamed treatments fluids of the present invention may be used in drilling operations. In the drilling embodiments, a foamed treatment fluid of the present invention comprising an aqueous liquid, a gas, and an ionic foaming surfactant may be provided. The foamed treatment fluid may be prepared from the treatment fluids of the present invention as described above. Further, the foamed treatment fluid may be circulated in a well bore so that a plurality of debris particulates (e.g., drill cuttings) present in the well bore become suspended in the foamed treatment fluid. In certain embodiments, the foamed treatment fluid is circulated in the well bore through the inside of a drill string disposed in the well bore, out through the drill bit connected to one end of the drill string, and up to the surface through the annulus between the drill string and the well bore. During circulation to the surface and/or at the surface, the temperature of the foamed treatment fluid may be lowered to about at or below the foam transition temperature so as to defoam the foamed treatment fluid. Among other things, defoaming may facilitate the separation of the debris particulates from the foamed treatment fluid. The foaming and/or defoaming may be repeated so that the treatment fluid may be reused as desired in the same or a different subterranean treatment.

In some embodiments, the foamed treatments fluids of the present invention may be used in well bore cleanup operations. In the well bore cleanup embodiments, a foamed treatment fluid of the present invention comprising an aqueous liquid, a gas, and an ionic foaming surfactant may provided. The foamed treatment fluid may be prepared from the treatment fluids of the present invention as described above. Further, the foamed treatment fluid may be circulated in a well bore so that a plurality of debris particulates (e.g., drill cuttings, debris from milling operations, perforating debris, etc.) present in the well bore become suspended in the foamed treatment fluid. In certain embodiments, the foamed treatment fluid is circulated in the well bore through the inside of a conduit (e.g., a drill string, tubing, casing, pipe) disposed in the well bore, out through one end of the conduit, and up to the surface through the annulus between the conduit and the well bore. During circulation to the surface and/or at the surface, the temperature of the foamed treatment fluid may be lowered to about at or below the foam transition temperature so as to defoam the foamed treatment fluid. Among other things, defoaming may facilitate the separation of the debris particulates from the foamed treatment fluid. The foaming and/or defoaming may be repeated so that the treatment fluid may be reused as desired in the same or a different subterranean treatment.

In some embodiments, the foamed treatments fluids of the present invention may be used in fracturing treatments. In the fracturing embodiments, a foamed treatment fluid of the present invention comprising an aqueous liquid, a gas, and an ionic foaming surfactant may be provided. The foamed treatment fluid may be prepared from the treatment fluids of the present invention as described above. Further, the subterranean formation may be contacted with the foamed treatment fluid at a pressure sufficient to create or enhance at least one fracture in the subterranean formation. At a desired time in the fracturing treatment, proppant particulates may be included in the foamed treatment fluids of the present invention. After a desired time, the pressure maintained on the well bore during the fracturing treatment is released. Upon the release of the pressure, the gas contained in the foamed treatment fluid should expand and flow back to the surface, allowing for recovery of the foamed treatment fluid. During recovery to the surface and/or at the surface, the temperature of the foamed treatment fluid may be lowered to about at or below the foam transition temperature so as to defoam the foamed treatment fluid. The foaming and/or defoaming may be repeated so that the treatment fluid may be reused as desired in the same or a different subterranean treatment.

In some embodiments, the foamed treatments fluids of the present invention may be used in sand control treatments. In the sand control embodiments, a foamed treatment fluid of the present invention comprising an aqueous liquid, a gas, gravel particulates, and an ionic foaming surfactant is provided. The foamed treatment fluid may be prepared from the treatment fluids of the present invention as described above. Further, the foamed treatment fluid should be circulated in the well bore so that at least a portion of the gravel particulates are deposited within or adjacent to a portion of the subterranean formation to form a gravel pack. After a desired time, the pressure maintained on the well bore during the sand control treatment is released. Upon the release of the pressure, the gas contained in the foamed treatment fluid should expand flow back to the surface, allowing for recovery of the foamed treatment fluid. During recovery to the surface and/or at the surface, the temperature of the foamed treatment fluid may be lowered to about at or below the foam transition temperature so as to defoam the foamed treatment fluid. The foaming and/or defoaming may be repeated so that the treatment fluid may be reused as desired in the same or a different subterranean treatment.

To facilitate a better understanding of the present invention, the following examples of preferred embodiments are given. In no way should the following examples be read to limit, or define, the scope of the invention.

EXAMPLES

Example 1

100 milliliters of fresh water were added to a Waring blender. While mixing at 8,700 rpm, 1 milliliter of an alkyl sulfate of Formula I with 0 moles of ethylene oxide substitution was added to the blender. Mixing was continued for about 15 seconds, and the resultant foamed water was poured into a graduated cylinder. The foamed water was observed to determine its half life at both 73° F. and 94° F. As used herein, "half life" refers to the time required to drain half the original liquid phase from the foam. The above procedure was repeated using alcohol ether sulfates of Formula II having from 1 mole to 5 moles of ethylene oxide substitution. The results of these tests are depicted in Table 1.

TABLE 1

| Surfactant No. | Ethoxylation (moles of EO) | Half Life at 73° F. (min) | Half Life at 94° F. (min) |
|---|---|---|---|
| 1 | 0 | 7.5 | 5.5 |
| 2 | 1 | 7.0 | 5.0 |
| 3 | 2 | 7.0 | 5.0 |
| 4 | 3 | 5.0 | 4.0 |
| 5 | 5 | 4.0 | 4.0 |

Example 2

100 milliliters of brine water containing 0.25% potassium chloride was added to a Waring blender. While mixing at 8,700 rpm, 1 milliliter of an alkyl sulfate of Formula I with 0 moles of ethylene oxide substitution was added to the blender. Mixing was continued for about 15 seconds. The brine water did not form a stable foam at room temperature. The temperature of the brine water was raised to 75° F. and the brine water was again mixed at 8,700 rpm for 15 seconds. The brine water did not foam at 75° F. so the mixing was repeated while raising the temperature in 5 degree increments, until foaming occurred. Foaming occurred at 85° F., which was the foam transition temperature for the brine water. When the temperature of foamed brine water was reduced below this foam transition temperature, the foam destabilized and defoamed. Once defoamed, the brine water was again mixed at 8,700 rpm for 15 seconds at the foam transition temperature to form a foam.

The above procedure was repeated using alcohol ether sulfates of Formula II having from 1 mole to 5 moles of ethylene oxide substitution for both brine water containing 0.25% potassium chloride and brine water containing 0.5% potassium chloride to determine the foam transition temperature for the brine waters containing the ethoxylated alcohol ether sulfates. If foaming occurred at room temperature, the temperature of the foamed brine water was reduced until the foam destabilized and defoamed. The results of these tests for 0.25% and 0.5% potassium chloride are depicted in Tables 2 and 3, respectively.

TABLE 2

| Surfactant No. | Ethoxylation (moles of EO) | % KCl (by weight) | Foam Transition Temperature (° F.) |
|---|---|---|---|
| 1 | 0 | 0.25 | 85–95 |
| 2 | 1 | 0.25 | 80–85 |
| 3 | 2 | 0.25 | 75–78 |
| 4 | 3 | 0.25 | 72–76 |
| 5 | 5 | 0.25 | 73–83 |

TABLE 3

| Surfactant No. | Ethoxylation (moles of EO) | % KCl (by weight) | Foam Transition Temperature (° F.) |
|---|---|---|---|
| 1 | 0 | 0.50 | 95–100 |
| 2 | 1 | 0.50 | 90–95 |
| 3 | 2 | 0.50 | 85–90 |
| 4 | 3 | 0.50 | 55–60 |
| 5 | 5 | 0.50 | 50 |

Accordingly, Example 2 demonstrates the foaming and defoaming of a treatment fluid comprising an alcohol ether sulfate may be facilitated by controlling temperature.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of treating at least a portion of a subterranean formation comprising:

providing a treatment fluid having a foam transition temperature, the treatment comprising an aqueous liquid, and an ionic foaming surfactant;

foaming the treatment fluid to form a foamed treatment fluid;

circulating the foamed treatment fluid in a well bore penetrating the subterranean formation; and defoaming at least a substantial portion of the foamed treatment fluid, the defoaming comprising at least the step of lowering the temperature of the foamed treatment fluid to about at or below the foam transition temperature.

2. The method of claim 1 wherein the treating is a drilling operation, a well bore cleanup operation, a fracturing treatment, or a sand control treatment.

3. The method of claim 1 wherein the ionic foaming surfactant is selected from the group consisting of an alcohol ether sulfate, an alpha olefin sulfonate, an alkanesulfonate, an alkyl sulfate, a derivative thereof, and combinations thereof.

4. The method of claim 1 wherein the ionic foaming surfactant comprises an alkyl sulfate having the formula:

$$H(CH_2)_aOSO_3X$$

wherein a is an integer in the range of from about 8 to about 18, and X is any compatible cation.

5. The method of claim 1 wherein the ionic foaming surfactant comprises an alcohol ether sulfate having the following formula:

$$H(CH_2)_a(OC_2H_4)_bOSO_3X$$

wherein a is an integer in the range of from about 5 to about 16, b is an integer in the range of from about 1 to about 10, and X is any compatible cation.

6. The method of claim 5 wherein the alcohol ether sulfate is ethoxylated with up to about 5 moles of ethylene oxide.

7. The method of claim 1 wherein the ionic foaming surfactant comprises an alpha-olefin sulfonate prepared from an alpha olefin having from about 8 to about 18 carbons.

8. The method of claim 1 wherein the treatment fluid further comprises a salt.

9. The method of claim 1 wherein the treatment fluid further comprises at least one additive selected from the group consisting of a surfactant solubilizer, a buffer, particulates, and a gelling agent.

10. The method of claim 1 wherein the foaming comprises the steps of:

combining the treatment fluid with a gas so that the gas is at least partially incorporated into the treatment fluid, and raising the temperature of the treatment fluid to about at or above the foam transition temperature.

11. The method of claim 10 wherein the step of raising the temperature comprises at least one step selected from the group consisting of introducing the treatment fluid into the well bore, using a mechanical heater, and a combination thereof.

12. The method of claim 10 wherein the gas is selected from the group consisting of air, nitrogen, carbon dioxide, and methane.

13. The method of claim 1 wherein the step of lowering the temperature comprises at least one step selected from the group consisting of recovering the foamed treatment fluid from the well bore, using a heat exchanger, and a combination thereof.

14. The method of claim 1 further comprising suspending a plurality of particulate debris in the foamed treatment fluid while circulating the foamed treatment fluid in the well bore.

15. The method of claim 1 further comprising contacting the subterranean formation with the foamed treatment fluid at or above a pressure sufficient to create or enhance one or more fractures in the subterranean formation.

16. The method of claim 1 further comprising repeating the foaming the treatment fluid after the defoaming so that the treatment fluid may be reused.

17. method of claim 1 further comprising adjusting the foam transition temperature of the treatment fluid by including one or more salts in the treatment fluid.

18. A method of cycling the foaming of a treatment fluid comprising:

provinding a treatment fluid comprising an aqueous liquid and an ionic foaming surfactant;

foaming the treatment fluid to form a foamed treatment fluid having a foam transition temperature, the foaming comprising the steps of:

combining the treatment fluid with a gas so that the gas is at least partially incorporated into the treatment fluid, and raising the temperature of the treatment fluid to about at or above the foam transition temperature; and defoaming at least a portion of the foamed treatment fluid, the defoaming comprising at least the step of lowering the temperature of the foamed treatment fluid to about at or below the foam transition temperature.

19. The method of claim 18 wherein the ionic foaming surfactant is selected from the group consisting of an alcohol ether sulfate, an alpha olefin sulfonate, an alkanesulfonate, an alkyl sulfate, a derivative thereof, and combinations thereof.

20. A method of drilling comprising:

providing a treatment fluid having a foam transition temperature, the treatment fluid comprising an aqueous liquid, a salt, and an ionic foaming surfactant comprising an alcohol ether sulfate having the following formula:

$$H(CH_2)_a(OC_2H_4)_bOSO_3X$$

wherein a is an integer in the range of from about 5 to about 16, b is an integer in the range of from about 1 to about 10, and X is any compatible cation;

foaming the treatment to form a foamed treatment fluid;

circulating the foamed treatment fluid in a well bore penetrating a subterranean formation so that a plurality of debris particulates present in the well bore become suspended in the foamed treatment fluid; and defoaming at least a portion of the foamed treatment fluid, the defoaming comprising lowering the temperature of the foamed treatment fluid to about at or below the foam transition temperature.

* * * * *